United States Patent [19]

Eguchi et al.

[11] Patent Number: 5,568,337
[45] Date of Patent: Oct. 22, 1996

[54] HEAD POSITIONING USING A DISK DRIVE MOUNTED TO A ROTATING TABLE

[75] Inventors: Tadashi Eguchi, Kawasaki; Katsumi Momose, Yokohama; Hiroji Narumi; Tetsuharu Nishimura, both of Kawasaki; Kotaro Hosaka, Ushiku; Masaaki Tsukiji, Tokyo; Koh Ishizuka, Urawa, all of Japan

[73] Assignee: Canon Kabushiki Kaisha, Tokyo, Japan

[21] Appl. No.: 935,927

[22] Filed: Aug. 27, 1995

[30] Foreign Application Priority Data

Aug. 30, 1991 [JP] Japan .................... 3-220148

[51] Int. Cl.⁶ .................................. C11B 5/596
[52] U.S. Cl. .................... 360/78.11; 360/77.03; 360/106
[58] Field of Search ............... 360/77.03, 78.11, 360/106; 369/44.23, 112, 121, 56; 356/356

[56] References Cited

U.S. PATENT DOCUMENTS

| | | | |
|---|---|---|---|
| 4,980,783 | 12/1990 | Moir et al. | 360/77.02 |
| 5,000,572 | 3/1991 | Nose et al. | 356/356 |
| 5,162,955 | 11/1992 | Burdenko | 360/77.03 X |
| 5,268,801 | 12/1993 | Hazel et al. | 360/77.03 |
| 5,325,349 | 6/1994 | Taniguchi | 360/77.03 X |

FOREIGN PATENT DOCUMENTS 0168699 1/1986 European Pat. Off. .
0189503 8/1986 European Pat. Off. .

OTHER PUBLICATIONS

Patent Abstracts of Japan, Kokai No. 62-234280, vol. 12, No. 102, Apr. 1988.

*Primary Examiner*—Aristotelis Psitos
*Assistant Examiner*—James T. Wilson
*Attorney, Agent, or Firm*—Fitzpatrick, Cella, Harper & Scinto

[57] ABSTRACT

A device for detecting the position of an information recording or reproducing head relative to a recording medium; the head is relatively rotatable around a first axis with respect to the recording medium, and rotatable around a second axis parallel to the first axis. The device includes an autocollimator for measuring a relative positional relationship of the head substantially along the direction of the rotation around the second axis, a rotating table on which either the combination of the recording medium and the head or the autocollimator is mounted to activate the rotational movement substantially around the second axis, and a control unit. The control unit rotates the rotating table in response to the obtained position of the head with respect to the recording medium. According to the measurement result by the autocollimator, the control unit accomplishes a relative positional controlling in which a relative positional relationship between the autocollimator and the head is kept constant. As a result, a compact and high-accuracy head positioning device is achieved.

6 Claims, 9 Drawing Sheets

FIG. 6
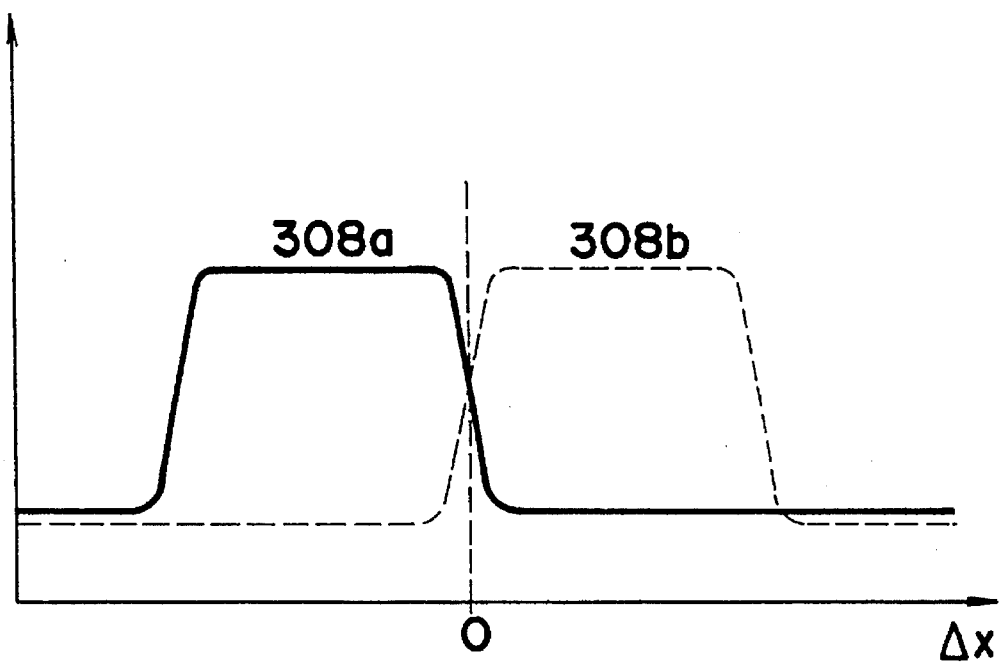
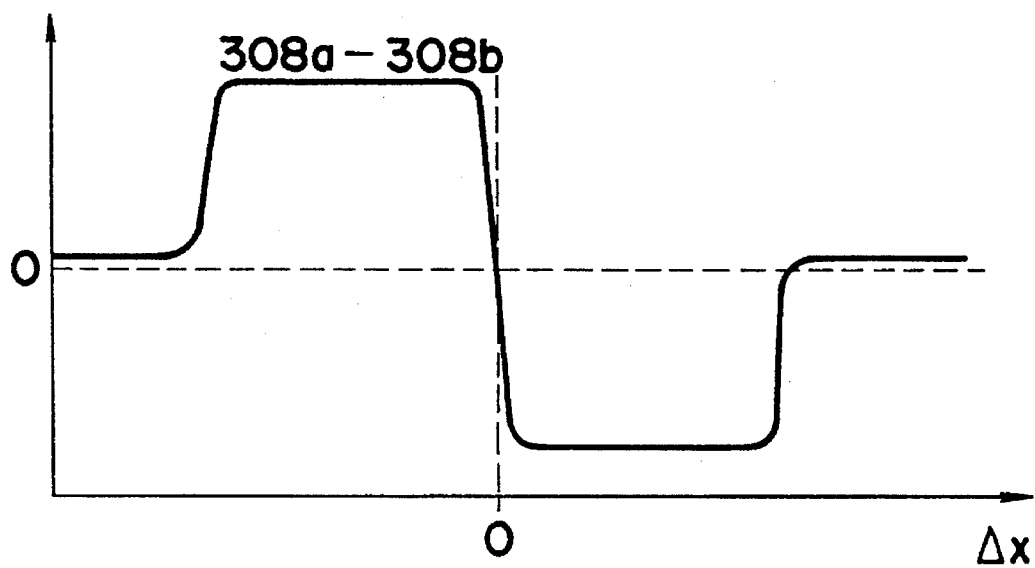

HEAD POSITIONING USING A DISK DRIVE MOUNTED TO A ROTATING TABLE

BACKGROUND OF THE INVENTION

1. Field of the Invention

The present invention relates to a head positioning device which is applied to, for example, a servo track writer for writing servo information onto a magnetic disk as a recording medium.

2. Related Background Art

With the advance of a larger memory capability and a compact design in computers, there is a growing demand for high density in a magnetic disk employed as a recording medium in computers. The magnetic disks need servo information written thereon in advance. An area having servo information written is called a servo track in a magnetic disk. A manufacturing apparatus for writing the servo track is also required to have high accuracy, with the advance of high density in magnetic disk.

FIG. 1 illustrates a conventional apparatus for such a servo track writer. This apparatus comprises a high-precision frequency-stabilized laser light source 1a, a reflection mirror 2, a beam splitter 3, a head arm 4 of a magnetic disk, corner cubes 5a, 5b, a magnetic head 6, a magnetic disk 7, a photoreceiver 8, a control circuit 9, a drive motor 10 for driving the head arm 4 and a casing 11 for housing the magnetic disk.

The laser light source 1a, the beam splitter 3, the corner cubes 5a, 5b and the photoreceiver 8 constitute a laser interferometer. The writing position (position along a radial direction of the magnetic disk 7) of the magnetic head 6 is controlled so that the photoreceiver 8 detects a displacement of the corner cube 5b mounted on the head arm 4 and the control circuit 9 controls the head arm driving motor 10 until the angle of rotation of the motor 10 agrees with a predetermined angle. The magnetic disk 7 is rotated on its own center by a drive motor (not shown), and a plurality of concentric servo tracks are formed by the magnetic head 6.

SUMMARY OF THE INVENTION

It is a first object of the present invention to provide a novel head positioning device capable of furnishing a user with better operability (for example, a high accuracy for detection, or making an apparatus compact) in a product, than that of the conventional example.

It is a second object of the present invention to provide a head positioning device capable of performing head positioning with accuracy, even if the device is applied to an apparatus in which an arm is rotated in order to relatively move substantially in a radial direction of a recording medium, as in said conventional example.

It is a third object of the present invention to provide a head positioning device capable of being arranged so as to detect a position of a head without enlarging the size of the device in an apparatus in which recording or the like is accomplished on the surface of a recording medium by relatively moving the head in the radial direction of the disk-like recording medium as in said conventional example.

BRIEF DESCRIPTION OF THE DRAWINGS

FIG. 6 illustrates a change in the incident light quantity on a photoreceiver due to positional displacement between the non-contact sensor and an index in the embodiment of FIG. 4;

DESCRIPTION OF THE PREFERRED EMBODIMENTS

Figure 2:
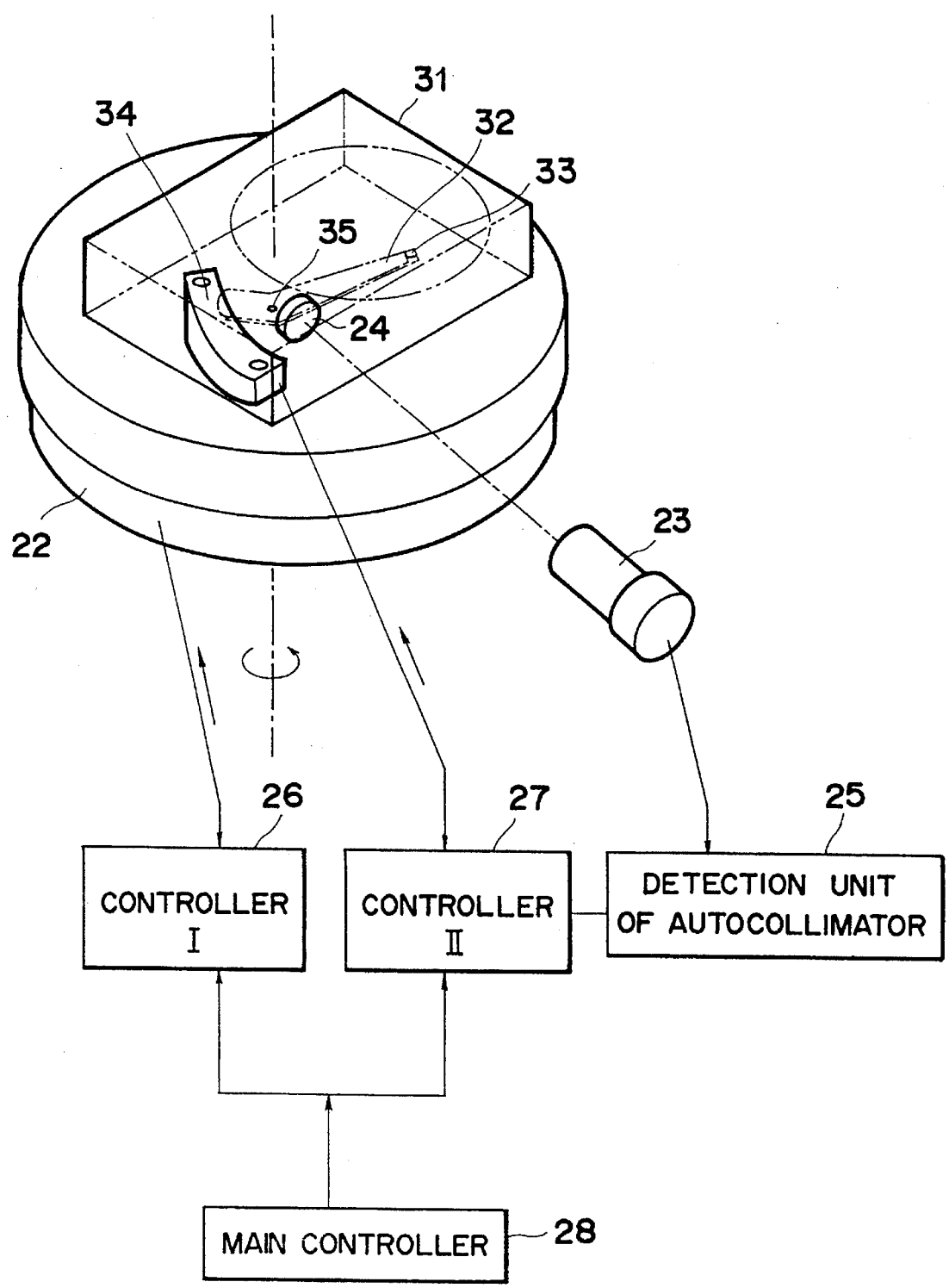
FIG. 2 illustrates an embodiment wherein a reflection portion is provided on a head to perform a control so as not to change a relative positional relationship between the head and an autocollimator functioning as a non-contact sensor.

FIG. 2 illustrates a first embodiment of a device including an autocollimator, according to the present invention. Shown in that figure are a fixed disk unit 31, a rocking arm 32, a read and write magnetic head 33 and a drive mechanism 34 for the rocking arm 32. The fixed disk unit 31 is mounted on a rotating table 22. An autocollimator 23 is so arranged as to detect rotational position of a mirror 24 mounted on the rocking arm 32. Since a principle of an autocollimator is well known, its detailed description is omitted. A reference numeral 25 denotes a detection unit of the autocollimator 23. In response to an output signal from the detection unit 25 of the autocollimator 23, a controller II 27 controls the rocking arm drive mechanism 34 in the fixed disk unit 31 to drive the rocking arm 32. A reference numeral 26 denotes a controller I for positioning the rotating table 22. A main controller 28 controls the entire servo track writer. This servo track writer further includes an unshown mechanism required for writing servo tracks. A pivot 35 of the rocking arm 32 substantially accords with the center of rotation of the rotating table 22.

Description will now be made of a procedure for writing servo tracks in this embodiment.

Servo tracks of a fixed magnetic disk are usually written on a magnetic disk surface with equal intervals, for example 10 μm, to record servo information required for head positioning. In this embodiment, the fixed disk unit in which servo tracks are to be written is mounted on the rotating table 2, the rotating table 2 is rotated by an encoder or a stepping motor so that the head may be positioned so that track pitch is of a constant interval, and a plurality of concentric servo tracks are written at every positioning position.

Figure 3:
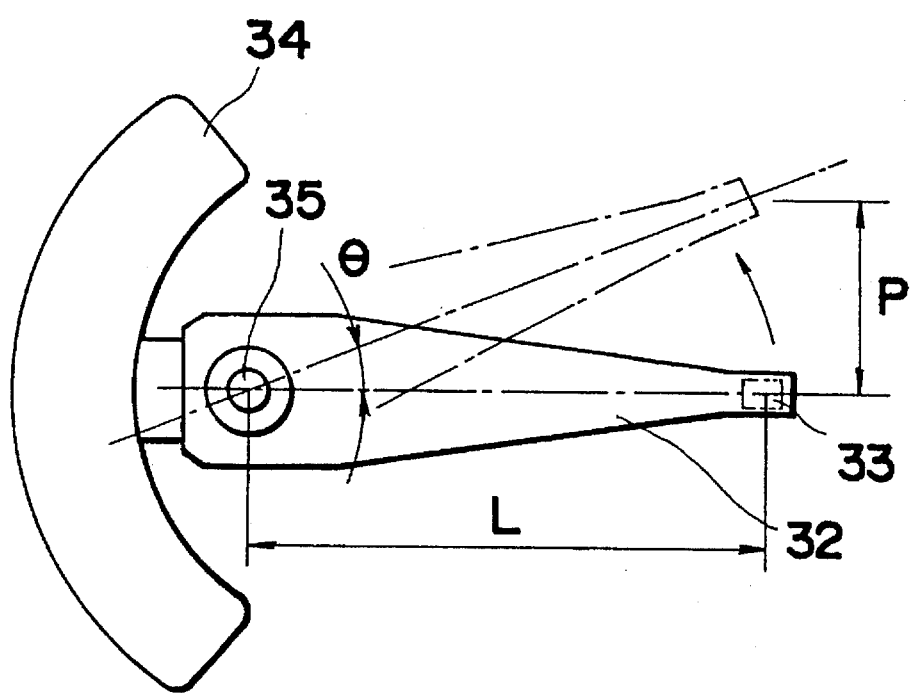
FIG. 3 illustrates a relationship between a track pitch P of servo tracks and an angle of rotation θ.

An angular interval θ for positioning the rotating table is set to be θ=P/L, where the distance between the pivot 35 of the rocking arm 32 and the head 33 is L and the track pitch is P as illustrated in FIG. 3.

In this embodiment, the angle of rotation of the rocking arm 32 is detected by the autocollimator 23, and the rocking arm drive mechanism 34 in the fixed disk unit 31 is controlled to drive the rocking arm 32 so that the output from the autocollimator 22 is kept constant, i.e., so that the relative positional relationship between the head 33 including the mirror 24 and the autocollimator 23 functioning as a non-contact sensor is not changed. With the above arrangement, the head 33 moves in the radial direction of the magnetic disk surface with the rotation of the rotating table 22. The rotating table 22 is positioned at an angular interval θ=P/L, thus performing the positioning of the head 33 in the radial direction of the magnetic disk.

According to the operation described above, while the rocking arm 32 is positioned at the servo track pitch, the servo tracks are written on the disk.

In the above embodiment, the fixed disk unit is mounted on the rotating table and the autocollimator is mounted on the fixed table. Alternatively, it may also be contemplated that the fixed disk unit is mounted on the fixed table and the autocollimator is mounted on the rotating table so that an angle of rotation of the rocking arm may be detected by the autocollimator. In this case, the center of rotation of the rotating table is set to accord substantially with the pivot of the rocking arm of the fixed disk unit. The rocking arm drive mechanism is also driven and controlled so that the output from the autocollimator is kept constant, in the same manner as already described.

The rotating table 22 may be controlled by an angle detector such as a high-resolution rotary encoder or a resolver, or by a stepping motor.

In the embodiment illustrated in FIG. 2, the mirror 24 for the autocollimator is mounted on the rocking arm 32. In the majority of fixed disk units, a voice coil is employed to drive a rocking arm, thus the mirror may be mounted on the drive portion of the voice coil.

Figure 1:
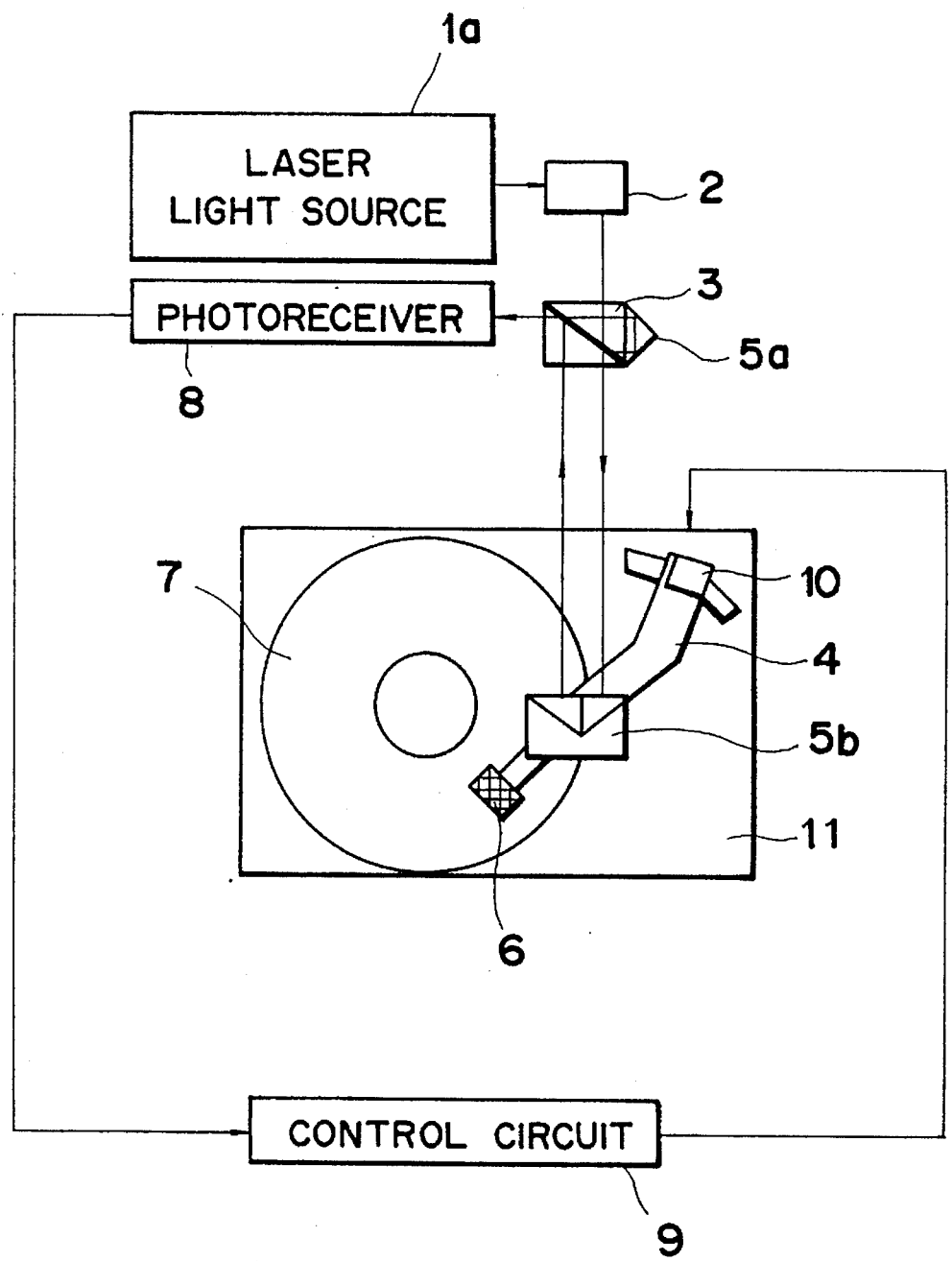
FIG. 1 illustrates a conventional head positioning device.

The advantages of the above embodiment are described below. The device, illustrated in FIG. 1, for example, has a problem that the relative positional relationship between the corner cube 5 mounted on the arm 4 and the laser interferometer is changed with rotation of arm 4, and light is not incident effectively on the corner cube 5 with the movement of the head arm, thereby making it impossible for the head to carry out positioning.

In this embodiment, the arm 32 is rotatively controlled so that the inclination of mirror 24, which would otherwise vary with the rotation of the rotating table 22, may be kept constant.

In this case, the center of rotation of the rotating table 22 accords with the pivot of the rocking arm 32. Accordingly, even if the rotating table 22 is rotated, the positional relationship between the autocollimator 23 and the mirror 24 is substantially unchanged, whenever the arm 32 is positioned at any position along the radius of the disk, so that light of the autocollimator is effectively used for measurement. The center of rotation of the rotating table 22 may not accord strictly with the pivot of the rocking arm 32. For example, in the case that a sensor (not detecting an angle) capable of measuring a distance to the mirror 24 instead of the autocollimator is employed, accurate positioning is impossible, because if there is any offset between the center of rotation of the rotating table and the pivot and when the rotating table is rotated while controlling the interval between the sensor and mirror to be kept constant, a displacement of the entire arm due to the offset is mixed with the interval value detected by the sensor as error component. Since the mirror angle detection method is employed in this embodiment, the displacement of the entire arm due to the offset is not detected, thus making accurate positioning possible regardless of some degree of the offset.

Figure 4:
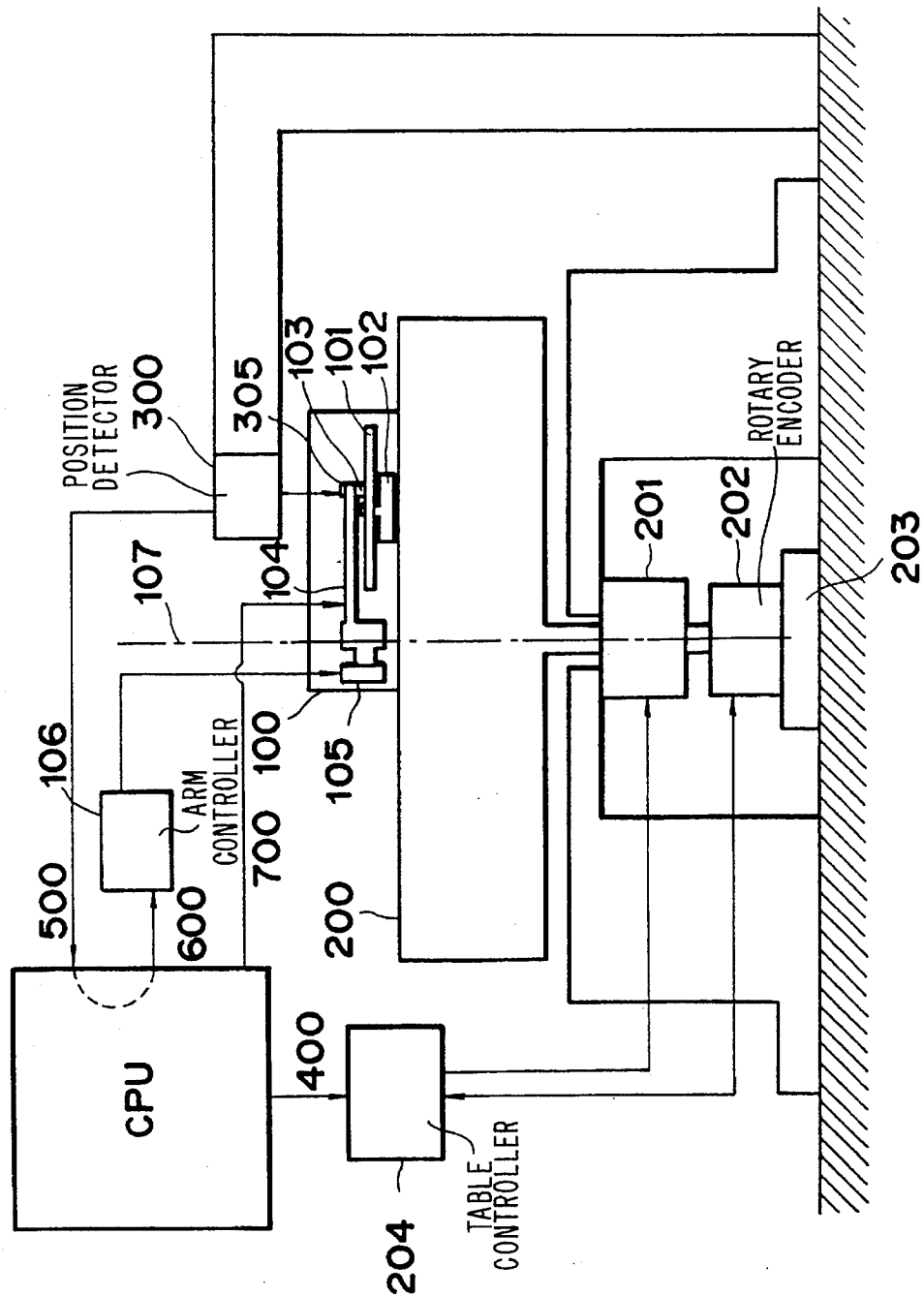
FIG. 4 illustrates an embodiment wherein an index comprising a reflection portion and a non-reflection portion is provided on a head to perform a control so as not to change a relative positional relationship between the head and a non-contact sensor.
Figure 9:
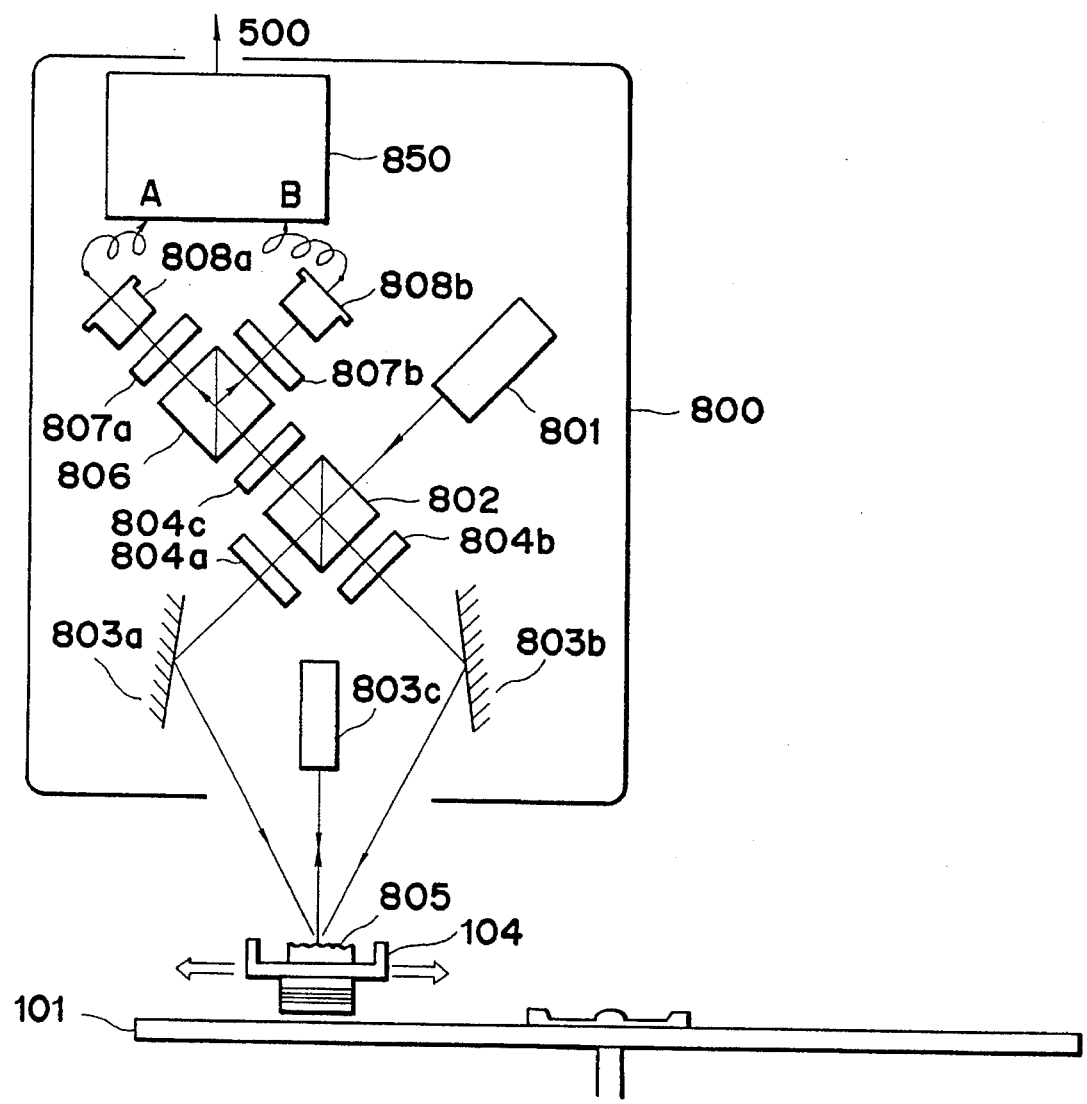
FIG. 9 illustrates the non-contact sensor and its peripherals of the embodiment of FIG. 8.

Next, in the embodiments illustrated in FIG. 4, to FIG. 9, optical origin position detection means is used, wherein an index plate having an interface between a reflection portion and a non-reflection portion is attached to a head arm, a condensed light beam is irradiated onto the index plate, a change in spatial distribution of the light reflected therefrom is detected by two photoreceivers arranged spatially with respect to each other to pick up a variation in the differential output between the two photoreceivers to generate a signal responsive to a relative positional displacement between a magnetic head and a non-contact sensor. The head arm is controlled on the basis of the signal in such a manner that the relative positional displacement is returned to the original, that is, the relative position relationship of the head arm with respect to the non-contact sensor is kept unchanged.

FIG. 4 shows an example in which a magnetic disk unit is mounted on a rotating table. Shown in that figure are a magnetic disk unit 100, a magnetic disk 102, a magnetic disk drive actuator 102 (for example, a motor), a recording head 103 for the magnetic disk 102, a write head arm 104 for the magnetic disk 102, an actuator 105 for driving the arm, an arm driving actuator controller 106, a rotating table 200, a rotating table driving actuator 201, a rotating table position detection device 202 (for example, a rotary encoder), a center of rotation 203 of the rotating table 200, a rotating table driving actuator controller 204, a magnetic disk recording head detection device or arm position detection device 300, a rotating table control signal 400 for positioning instructions, a detected positional displacement signal 500 for the write head or the head arm, and a servo track write signal 700. Both the rotating table 200 and the arm 104 commonly have an axis of rotation 107.

Servo information is written in the following procedure.

(1) The rotating table 200 is set at a particular position by an instruction 400 from CPU (the control system made of the combination of the actuator 201, the position detection device 202, and the actuator controller 204 is working in this step).

(2) When the rotating table 200 begins rotating, the relative position is offset between the magnetic disk recording head 103 (or the arm 104) and the magnetic disk recording head detection device 300, and the displacement signal 500 is sent to the CPU (the position detection device 300 is fixed).

(3) An instruction 600 from the CPU causes the actuator 105 to move until the displacement signal from the position detection device 300 returns to its original value.

(4) Upon completing step (3), a servo track signal 700 is transferred to the recording head 103 to be written on the magnetic disk.

(5) Steps (1) through (4) are then repeated.

Figure 5:
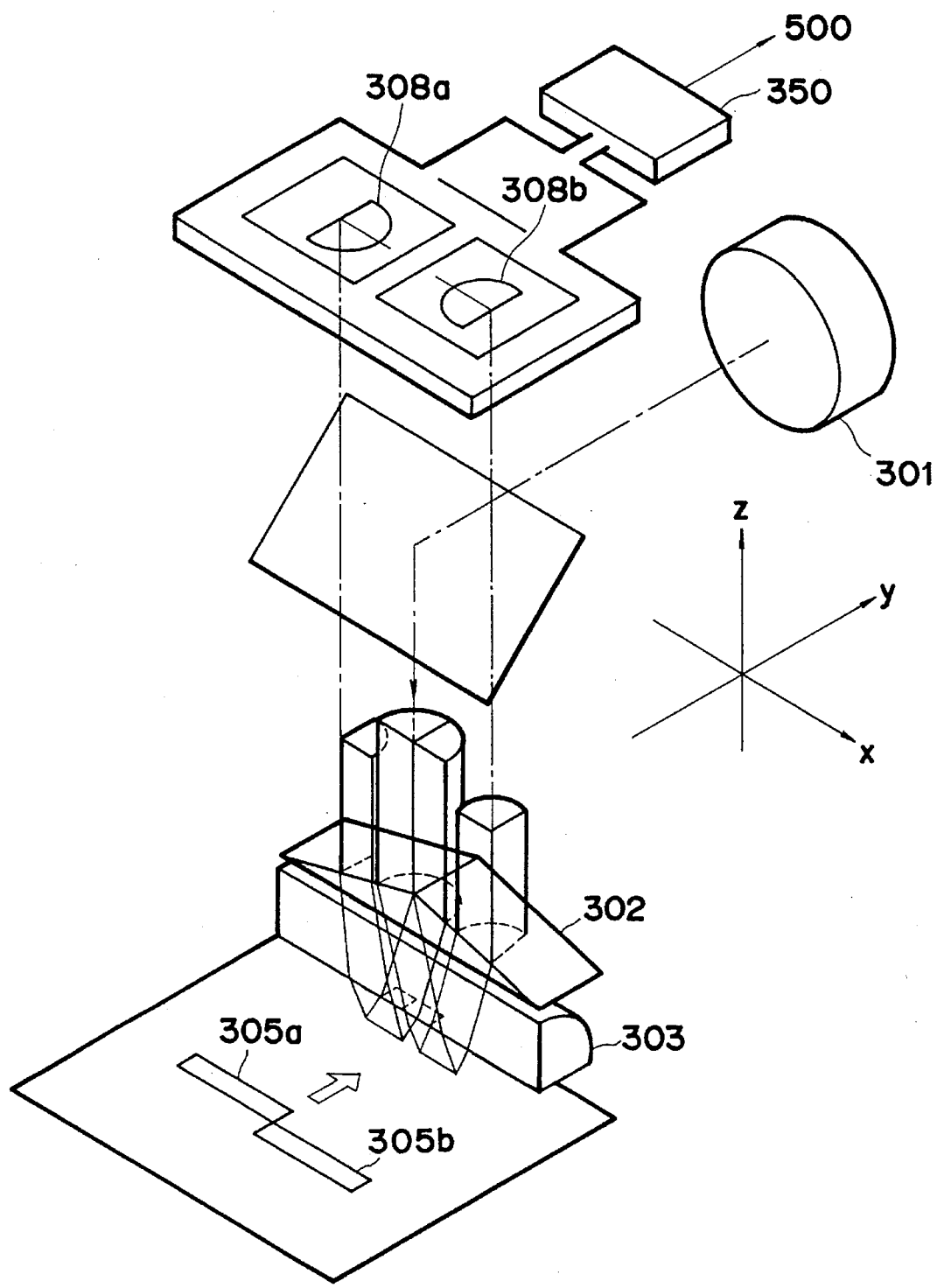
FIG. 5 illustrates the non-contact sensor and its peripherals of the embodiment in FIG. 4.

FIG. 5 illustrates the function of the position detection device 300 of the magnetic disk recording head 103 or of the arm 104. Shown in the figure are a light source (of parallel light flux), a wavefront splitting prism 302, a cylindrical lens 303, stepwise rectangular patterns 305a, 305b, photoreceivers 308a, 308b, an amplifier and processing board 350 and a positional displacement signal 500. In FIG. 5, both the wavefront splitting prism 302 and the cylindrical lens 303 are illustrated in only their half portion extending along the y axis.

The substantially parallel light flux emitted from the light source 301 is split into two fluxes (along the x axis in FIG.

5) by the wavefront splitting prism 302. Each flux is condensed by the cylindrical lens 303 in a form of a linear beam (narrowed with respect to the y axis), and both the beams are irradiated onto the rectangular reflection pattern and the non-reflection pattern. Both beams reflected by the reflection pattern are transmitted through the cylindrical lens 303 while their beam widths gradually return to their original widths, and then are incident on the wavefront splitting prism 302 on its peripheral portions to be refracted, so that both beams travel in parallel with the incoming light fluxes emitted from the light source. Both beams then are incident on each of the photoreceivers 308a, 308b.

In the above optical system, when the index 305 moves, each area of reflection portion in the region onto which the light beam is being irradiated is changed relatively as shown in FIG. 6. The differential output (analog) signal between the photoreceivers 308a, 308b represents a relative positional displacement between the index and the beams (i.e., the position detection device 300), and its resolution is determined by the beam width of the linear beam. The cylindrical lens 303 is provided for resolution enhancing purposes. The direction of the displacement of the index can be discriminated according to information whether the differential signal is changed to positive (+) or to negative (−). As is apparent from the upper and lower graphs shown in FIG. 6, a position where the displacement is zero, that is, the differential signal is zero, corresponds to a boundary position between a reflection part and a non-reflection part of the patterns 305a, 305b indicated by the waveforms of the detected signals (308a, 308b). The detection of the edge position between the patterns 305a, 305b is executed based on a detection of a zero differential signal.

The differential signal is processed into an optional format as the positional displacement signal 500, and then it is transmitted to the CPU.

In the embodiment in FIG. 4, the magnetic disk unit including the actuator 105 is mounted on the rotating table 200 in order to relatively move the magnetic head position detection device 300 and the magnetic disk unit. Alternatively, the magnetic head position detection device 300 may be mounted on the rotating table 200.

In the embodiment in FIG. 5, a light beam is split into two beams by the wavefront splitting prism, the two beams are independently irradiated onto two different patterns, and are received by two photoreceivers, respectively. An example illustrated in FIG. 7 may also be contemplated.

Figure 7:
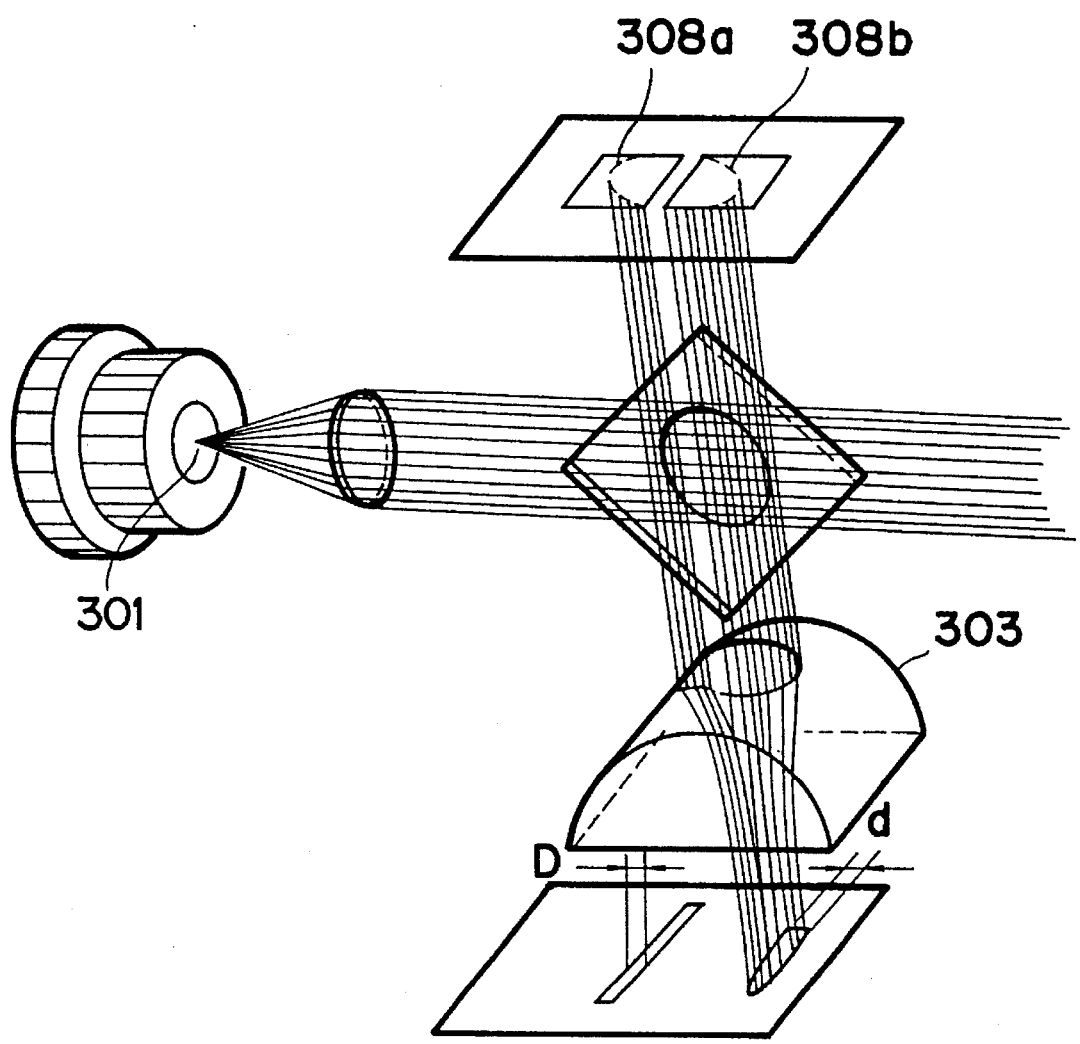
FIG. 7 shows a modified embodiment of the non-contact sensor of FIG. 4.

In FIG. 7, a substantially parallel light flux emitted from a light source 301 is condensed into a linear beam by a cylindrical lens 303, and the linear beam is directed to a single rectangular pattern made of a reflection portion and a non-reflection portion. In this case, if the linear beam is irradiated so that a beam width d irradiated on the pattern satisfies, D<d≦3D, with respect to a width D of the pattern in a direction of movement, a change in the spatial distribution of light flux reflected by the rectangular pattern is detected.

For example, if the index is located at the center within the beam irradiated region, the strongest beam is directed to an optical path in a direction of regular reflection. Thus, the light beam is incident in equivalent light quantity on the two photoreceivers 308a, 308b symmetrically arranged with respect to the optical path. This balance of the input light quantity between one photoreceiver 308a and the other photoreceiver 308b will be lost at the moment the index 305 moves toward either side.

In FIG. 5, the cylindrical lens 303 may be disposed above the wavefront splitting lens 302. Also, the cylindrical lens 303 may be omitted.

A half mirror or the like may be substituted for the wavefront splitting prism, wherein a light beam may be amplitude-split into two beams to be irradiated on the index.

Alternatively, an index having a single border between a reflection portion and a non-reflection portion may be employed. In this case, a single linear beam is irradiated on the index, then the beam reflected therefrom is received by a single photoreceiver, and a positional displacement signal of the index is generated when an output signal from the photoreceiver is beyond or below a predetermined threshold value.

As an alternative to a particular index adhered to, a configuration of a part in a magnetic head or an arm may be used. Also, the index may be directly printed.

In said embodiments and modifications, it is needless to say that when there is any variation, omission, or addition of some parts in the constitutional elements, or a change in their arrangement, it is within scope of the invention if it is an "origin position detection device" on the basis of the same principle as described above.

According to the embodiment described above, the detection of the head position is performed by the detection of the index, whereby the detection system can be disposed above the top side of a magnetic disk where space is still available, and the device becomes compact.

Figure 8:
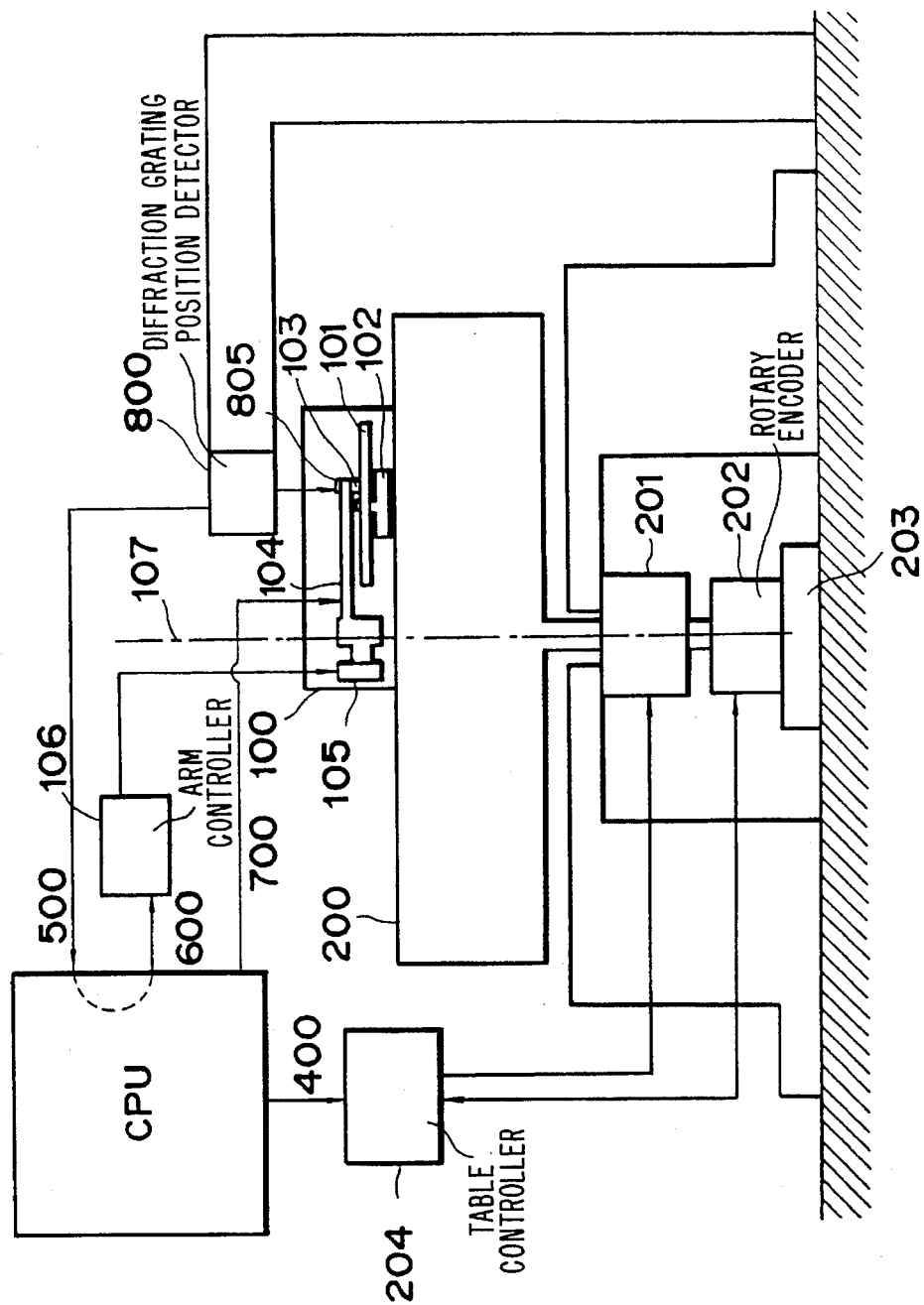
FIG. 8 illustrates an embodiment wherein a diffraction grating is provided on a head to perform a control so as not to change a relative position relationship between the head and a non-contact sensor.

FIG. 8 illustrates another embodiment. In this embodiment, a grating interference type encoder is employed, in which a diffraction grating 805 as an index is mounted on a head arm to generate a relative positional displacement signal between a head and a non-contact sensor. The head arm is controlled on the basis of the signal in such a manner that the relative positional displacement is returned to the original, that is, the relative positional relationship of the head arm with respect to the non-contact sensor is kept unchanged. In FIG. 8, the same reference numerals are utilized to denote identical elements used in FIG. 4. A reference numeral 800 is a position detection device, and 805 is a diffraction grating plate.

FIG. 9 illustrates the function of the position detection device 800 of the magnetic disk recording head 103 or of the arm 104. Also shown are a position detecting device housing 800, a monochromatic light source (a laser diode, for example) 801, a (polarization) beam splitter 802, mirrors 803a, 803b, a catoptric element 803c, quarter-wave plates (crystal optics elements) 804a, 804b and 804c, a diffraction grating plate 805 mounted on the arm 104, a (non-polarization) beam splitter 806, polarizing plates 807a, 807b, photoreceivers 808a, 808b, an amplifier and processing board 850 and a positional displacement signal 500.

The operation of this device along its optical path is described below.

(1) The light flux emitted from the monochromatic light source 801 is split by the beam splitter 802 per each of polarized components.

(2) After the transmitted light (P-polarized light flux) passes through the quarter-wave plate 804a, it is incident on the diffraction grating plate 805 through the mirror 803a. An n-th order diffraction light produced there is directed to the catoptric element 803c. The catoptric element 803c reflects the light back to the incoming optical path, and the reflected light is again incident on the diffraction grating plate 805. An n-th order diffraction light further produced there is directed to the mirror 803a to return to the original path, and is transmitted through the quarter-wave plate 804a. Since the light is transmitted twice through the quarter-wave plate 804a, the polarization plane is rotated by 90° as well known to be converted into S-polarized light. Since S-polarized components are reflected by the beam splitter 802, it is transmitted through the quarter-wave plate 804c to become a clockwise circular polarized light flux.

(3) In the light flux from the light source 801, the light flux (S-polarized) reflected at the beam splitter 802 is transmitted through the quarter-wave plate 804b, and then is incident on the diffraction grating plate 805 through the mirror 803b. An m-th order diffraction light produced there is directed to the catoptric element 803c. The catoptric element 803c reflects the light back to the incoming optical path, and the reflected light is again incident on the diffraction grating plate 805. The m-th order diffraction light further produced there is directed to the mirror 803b to return to the original path, and is transmitted through the quarter-wave plate 804b. In the same reason as in step (3), the polarization plane is rotated by 90° to be converted into P-polarized light. Since the P-polarized light components are transmitted through the beam splitter 802, it is transmitted through the quarter-wave plate 804c to become a counterclockwise circular polarized light flux.

(4) A single linearly polarized light flux is formed by combining the vectors of the light fluxes obtained in steps (2) and (3), as well known.

(5) It is also well known that a phase of the wavefront is shifted by $2\pi \times n$ when the diffraction grating 805 is relatively moved by a distance equal to the grating's one pitch, accordingly, the phase of the n-th order diffraction light is shifted by $4\pi n$ ($=2\pi \times n \times 2$), and that of the m-th order diffraction light is shifted by $4\pi m$ ($=2\pi \times m \times 2$).

When n=+1, m=−1, a relative movement of the diffraction grating by one pitch causes a phase difference of $8\pi$ between the diffraction lights.

(6) The orientation of the plane of the linearly polarized light in step (4) is determined by the phase difference between the two diffraction lights as below.

| Phase difference | Orientation of the polarization plane |
| --- | --- |
| 0 | +45° |
| π/4 | +22.5° |
| 2 π/4 | +0° |
| 3 π/4 | −22.5° |
| 4 π/4 | +45° |
| ... | ... |

A phase difference of $\pi$ causes the polarization plane to rotate by 90°.

(7) The beam splitter 806 splits the incident diffraction lights into two equal light fluxes. When one of the two light fluxes is observed through the polarizing plate 807a which allows the light having a 0° polarization plane only to be transmitted, brightness alternates periodically. That is, a brightness signal of one cycle is produced every $2\pi$ of phase difference between the two diffraction lights, and it is incident on the photoreceiver 808a.

When the other of the two light fluxes is observed through the polarizing plate 807b which allows light having a 45° polarization plane only to be transmitted a brightness signal is obtained similarly.

However, there is a time difference between the timing at which the polarization orientation of the plate 807b agrees with the orientation of the polarization plane of one light flux and the timing at which the polarization orientation of the plate 807a agrees with the orientation of polarization of the other light flux. This time difference is a quarter of one cycle of the brightness signal.

(8) Sinusoidal-wave-like signals of different timing are obtained by two photoreceivers 808a, 808b. Therefore, the direction of movement of the diffraction grating 805 is determined by the direction of phase difference between the two light fluxes.

(9) The two signals described above are signal-processed into optional format as a positional displacement signal 500, and it is transmitted to the CPU.

In the embodiment in FIG. 8, the magnetic disk unit including the actuator 105 is mounted on the rotating table in order to relatively move the magnetic head position detection device 800 and the magnetic disk unit. Alternatively, the magnetic head position detection device 800 may be mounted on the rotating table.

The embodiment in FIG. 8 is an example of the grating interference type encoder which is formed of the combination of an arrangement of mirrors and prisms in a head position detection optical system, a routing method of light fluxes, conversions of polarization planes of light fluxes using wave plates, a method of detecting a phase difference of the wavefronts of diffraction light fluxes due to the positional displacement of a diffraction grating, and a periodic phase difference signal generation method in combination with a polarization technique. The embodiment may be partly modified, partly omitted, implemented in a different sequential order from the one described above, or may include additional steps, as long as the principle of the grating interference type encoder is followed.

What is claimed is:

1. A device for positioning an information recording or reproducing head capable of rotating relative to a recording medium around a first axis and of also rotating in a direction intersecting the relative rotational direction around a second axis parallel to the first axis, relative to the recording medium, said device comprising:

a photoelectric detection system for measuring a relative positional relationship of the head substantially along the direction of the rotation around the second axis, the photoelectric detection system detecting positional information of a position detection index mounted on a member for supporting the head in a manner that the index is detected from a direction intersecting a plane containing the rotating direction around the first axis or the second axis, the photoelectric detection system comprising means for detecting an edge portion of the position index to detect the positional information;

a rotating table on which either a combination of the storage medium and the head or the photoelectric detection system is mounted to drive the combination or the detection system; and a control unit for rotating the rotating table in response to a positioning position of the head with respect to the recording medium, and for performing a relative positional control so that a relative positional relationship between the photoelectric detection system and the head is kept constant on the basis of the measurement result by the photoelectric detection system during rotation of the rotating table.

2. A device according to claim 1, wherein the photoelectric detection system comprises a plurality of photoelectric convertors, the measurement of the relative positional relationship being performed by comparing outputs from the plurality of the photoelectric devices.

3. A device according to claim 1, further comprising a rotation detector for detecting the rotation of the rotating table, whereby the control unit rotates the rotating table on the basis of the detection result of the detector.

4. A device for positioning an information recording or reproducing head mounted to a first surface of a supporting member and capable of rotating relative to a recording medium along a first axis and of also rotating in a direction intersecting the relative rotational direction around a second axis parallel to the first axis, relative to the recording medium, said device comprising:

a photoelectric detection system for measuring a relative positional relationship of the head substantially along the direction of the rotation around the second axis, the photoelectric detection system detecting positional information of a position detection index mounted to a second surface of the head supporting member, at a position opposite to the position on the first surface to which the head is mounted, the photoelectric detection system detecting the positional information in a manner that the index is detected from a direction intersecting a plane containing the rotating direction around the first axis or the second axis;

a rotating table on which either a combination of the storage medium and the head or the photoelectric detection system is mounted to drive the combination or the detection system; and a control unit for rotating the rotating table in response to a positioning position of the head with respect to the recording medium, and for performing a relative positional control so that a relative positional relationship between the photoelectric detection system and the head is kept constant on the basis of the measurement result by the photoelectric detection system during rotation of the rotating table.

5. A device according to claim 4, wherein the photoelectric detection system includes a grating interference type encoder, and the position detection index includes a diffraction grating.

6. A device according to claim 4, wherein the position detection index includes a diffraction grating.

* * * * *

UNITED STATES PATENT AND TRADEMARK OFFICE
CERTIFICATE OF CORRECTION

PATENT NO. : 5,568,337
DATED : October 22, 1996
INVENTOR(S) : TADASHI EGUCHI, ET AL.

It is certified that error appears in the above-indentified patent and that said Letters Patent is hereby corrected as shown below:

ON THE COVER PAGE

AT ITEM [22] "Filed"

"Aug. 27, 1995" should read --Aug. 27, 1992--.

Signed and Sealed this

Thirtieth Day of September, 1997

Attest:

BRUCE LEHMAN

Attesting Officer

Commissioner of Patents and Trademarks